(12) United States Patent
Lu et al.

(10) Patent No.: US 11,999,634 B2
(45) Date of Patent: Jun. 4, 2024

(54) EVAPORATOR FOR SOLAR DESALINATION, PREPARATION METHOD THEREFOR AND USE THEREOF

(71) Applicant: City University of Hong Kong Shenzhen Futian Research Institute, Guangdong (CN)

(72) Inventors: Jian Lu, Guangdong (CN); Zhengyi Mao, Guangdong (CN)

(73) Assignee: City University of Hong Kong Shenzhen Futian Research Institute, Guangdong (CN)

( * ) Notice: Subject to any disclaimer, the term of this patent is extended or adjusted under 35 U.S.C. 154(b) by 0 days.

(21) Appl. No.: 18/062,283

(22) Filed: Dec. 6, 2022

(65) Prior Publication Data

US 2024/0018017 A1  Jan. 18, 2024

(30) Foreign Application Priority Data

Jul. 13, 2022  (CN) .......................... 202210827506.4

(51) Int. Cl.
*C02F 1/14* (2023.01)
*C02F 1/04* (2023.01)
*C02F 103/08* (2006.01)

(52) U.S. Cl.
CPC .............. *C02F 1/043* (2013.01); *C02F 1/042* (2013.01); *C02F 1/14* (2013.01); *C02F 2103/08* (2013.01); *C02F 2201/004* (2013.01); *C02F 2303/22* (2013.01)

(58) Field of Classification Search
CPC .. C02F 1/042; C02F 1/043; C02F 1/14; C02F 2103/08; C02F 2201/004; C02F 2303/22
See application file for complete search history.

(56) References Cited

U.S. PATENT DOCUMENTS

| | | | |
|---|---|---|---|
| 9,827,536 B2 * | 11/2017 | Yoneda | B01D 69/125 |
| 9,862,621 B2 * | 1/2018 | Ono | B01D 1/00 |
| 9,975,785 B2 * | 5/2018 | Taomoto | C02F 1/042 |
| 10,369,529 B2 * | 8/2019 | Diallo | B01D 67/0079 |
| 10,702,815 B2 * | 7/2020 | Chu | D04H 1/728 |
| 11,596,886 B2 * | 3/2023 | Chu | B01D 67/0088 |

(Continued)

FOREIGN PATENT DOCUMENTS

| CN | 114702093 A | * | 7/2022 | ............... C08J 9/42 |
|---|---|---|---|---|
| EP | 1274559 B1 | * | 2/2005 | ........... B29C 31/045 |

OTHER PUBLICATIONS

EP 1274559 PE2E Search Clarivate Analytics Machine Translation obtained Oct. 19, 2023. (Year: 2023).*

(Continued)

*Primary Examiner* — Jonathan Miller
(74) *Attorney, Agent, or Firm* — NKL Law; Allen Xue

(57) ABSTRACT

An evaporator for solar desalination and a preparation method thereof and use thereof are provided. The evaporator has a porous skeleton, interconnected channels, and a hydrophobic decoration. The interconnected channels are formed from gaps of the porous skeleton, and the hydrophobic decoration is positioned on the surface of the porous skeleton. The evaporator is for sustainable solar water evaporation even in highly salty water. Specifically, the continuous evaporation for 24 h without salt precipitation in 20 wt % NaCl solution can be realized.

12 Claims, 7 Drawing Sheets

(56) References Cited

U.S. PATENT DOCUMENTS

| | | | | |
|---|---|---|---|---|
| 2015/0053610 | A1* | 2/2015 | Diallo | C02F 1/44 |
| | | | | 210/500.39 |
| 2015/0343393 | A1* | 12/2015 | Yoneda | B01D 69/10 |
| | | | | 210/490 |
| 2018/0037458 | A1* | 2/2018 | Zhamu | C04B 38/0022 |
| 2018/0221829 | A1* | 8/2018 | Cheng | B01D 69/125 |
| 2020/0016829 | A1* | 1/2020 | Ameloot | B33Y 10/00 |

OTHER PUBLICATIONS

CN114702093 PE2E Search Clarivate Analytics Machine Translation obtained Oct. 19, 2023. (Year: 2023).*

* cited by examiner

EVAPORATOR FOR SOLAR DESALINATION, PREPARATION METHOD THEREFOR AND USE THEREOF

CROSS REFERENCE TO RELATED APPLICATION

This application claims the priority of the prior application No. 202210827506.4 submitted to China National Intellectual Property Administration on Jul. 13, 2022, which is entitled "Evaporator for solar desalination, preparation method therefor and use thereof", the content of which is incorporated herein by reference in its entirety.

TECHNICAL FIELD

The present disclosure belongs to the field of solar desalination, and relates to an evaporator for solar desalination, a preparation method therefor and use thereof.

BACKGROUND ART

The shortage of clean water is one of the serious global challenges in the development of modern society, especially in remote rural areas. In recent years, interfacial solar steam generation (SSG) has been adopted as a low-cost, sustainable, and off-grid capability strategy for water desalination to produce clean water. Whereas, the salt-fouling not only drastically reducing the efficiency and evaporation rate, but also largely compromise the lifetime of the SSG systems. The reason behind this is, the salts precipitated on the evaporator surface, blocking the sunlight, clogging the water transport channels, reducing the effective evaporation area, and ultimately stopping the system. Therefore, for practical application, it is necessary to improve the salt-rejecting property, durability, and water collection rate.

Currently, two strategies are usually utilized to address the salt-fouling issue: localized salt crystallization and salt circulation. For the first method, salt crystallized on the specific position and then physically removed. This method requires subsequent cleaning steps leads to the discontinuous operation or reduced evaporation performance, and additional costs associated with system's maintenance, which makes it difficult for large-area applications. Meanwhile, work concerning salt circulation can be categorized into three kinds of methods: (i) Diffusion and advection-based salt rejection. With increase the water supply, the salt dissolution rate is greater than the precipitation rate, the formed salts dissolve back into the bulk water. Simultaneously, heat conducts through the fast salt diffusion from the hot evaporator surface to the bulk water, leading to the reduce of evaporation efficiency. (ii) Janus hydrophilic/hydrophobic structure to prevents salt from adhering. However, the janus structures usually kept small thickness to maintain the balance of the evaporation rate and salt resistance, which results insufficient thermal localization. (iii) By utilizing the Donnan effect to prevent salt crystallization. The ion screening was formed under the charged evaporator film due to electrostatic attraction and repulsion, which reduces the diffusion of salt ions but allows water to pass quickly. Despite the significant progress, the realization of evaporator system with long-term salt resistance performance, high evaporation rate, and collection rate for practical application are high desired, but remain challenging to develop.

SUMMARY OF THE INVENTION

Based on the inadequacies of prior art, the present disclosure provides an evaporator for long-term salt resistance even in highly salty water. The evaporator can be used in the field of solar desalination.

Specifically, the present disclosure provides the following scheme:

an evaporator, comprising a porous skeleton, interconnected channels, and a hydrophobic decoration, wherein the interconnected channels are formed from gaps of the porous skeleton, and the hydrophobic decoration is positioned on the surface of the porous skeleton.

According to an embodiment, the hydrophobic decoration is for avoiding salt depositing on the evaporation surface.

According to an embodiment, the porous skeleton comprises several micro-sized pathways.

Specifically, the micro-sized pathway in the porous skeleton is for fast diffusion of salt ions.

According to an embodiment, the interconnected channels are for arterial transporting salt ions to the bulk water.

According to an embodiment, the porous skeleton consists of interlaced filaments. Specifically, the porous skeleton comprises several layers, wherein each layer is formed from filaments arranged in an array, and the filaments between two adjacent layers are arranged in a staggered manner. For example, the filaments between two adjacent layers are perpendicular to each other.

According to an embodiment, the filament has a diameter of about 100 μm-1000 μm; illustratively, may have a diameter of 100 μm, 200 μm, 300 μm, 400 μm, 500 μm, 600 μm, 700 μm, 800 μm, 900 μm, or 1000 μm.

According to an embodiment, the evaporator has a porosity of 80%-95%; illustratively, may have a porosity of 80%, 82%, 84%, 85%, 86%, 88%, 90%, 92%, 95%, or any point value within a range consisting of a pairwise combination of those point values.

According to an embodiment, the porous skeleton has a porosity of 50%-70%. Specifically, the filament has a porosity of 50%-70%. Illustratively, the porous skeleton (e.g., the filament) has a porosity of 50%, 55%, 60%, 65%, 70%, or any point value within a range consisting of a pairwise combination of those point values.

According to an embodiment, the porous skeleton comprises a polymer matrix, and may further comprises at least one of a light absorbing material and a rheology modifier.

According to an embodiment, the polymer matrix has a polymer selected from a polyurethane, cellulose, alginate, polyvinyl alcohol, polyacrylamide and a mixture thereof.

According to an embodiment, the light absorbing material is selected from a carbon nanotube, carbon black, carbon nanodots, graphene and a mixture thereof.

According to an embodiment, the rheology modifier comprises a nanoclay, $SiO_2$, alginate, Pluronic F127, carbomer or a mixture thereof.

According to an embodiment, the interconnected channels are formed from the gaps between the filaments. Specifically, in each layer, the interconnected channels are formed from the gaps between the filaments arranged in an array; additionally, in the vertical direction, the interconnected channels may also be formed from the gaps between the filaments arranged in a staggered manner.

According to an embodiment, the interconnected channel has a diameter of about 100 μm-1000 μm; illustratively, may have a diameter of 100 μm, 200 μm, 300 μm, 400 μm, 500 μm, 600 μm, 700 μm, 800 μm, 900 μm, 1000 μm, or any point value within a range consisting of a pairwise combination of those point values.

According to an embodiment, the hydrophobic decoration comprises at least one of organopolysiloxane, a silane coupling agent and inorganic oxide. For example, the hydrophobic decoration comprises at least one of organopolysiloxane and a silane coupling agent; or a combination of at least one of organopolysiloxane and a silane coupling agent and at least one of inorganic oxide.

According to an embodiment, the organopolysiloxane is selected from polydimethylsiloxane (PDMS).

According to an embodiment, the silane coupling agent is selected from at least one of KH570, Sylgard 184 and SE 1700.

According to an embodiment, the inorganic oxide is selected from $TiO_2$, $SiO_2$ and a mixture thereof.

According to an embodiment, the hydrophobic decoration is attached to the porous skeleton via a chemical bond, e.g., a Si—O bond.

According to an embodiment, the hydrophobic decoration may further comprise ester compounds, e.g., ethyl acetate.

According to an embodiment, the hydrophobic decoration comprises PDMS; or PDMS and at least one of $TiO_2$, $SiO_2$. When the hydrophobic decoration comprises PDMS alone, the PDMS exerts a hydrophobic effect; and when the hydrophobic decoration comprises at least one of $TiO_2$ and $SiO_2$, PDMS may, in addition to its hydrophobic effect, act as a binder to bind at least one of $TiO_2$ and $SiO_2$ to the porous skeleton.

According to an embodiment, the evaporator can obtain the high evaporation rate, specifically, a high evaporation rate of 2.8 kg $m^{-2}$ $h^{-1}$ and a efficiency of 97% can be achieved irradiated by 1 intensity of the sun.

The present disclosure also provides a preparation method for the evaporator, which specifically comprises the following steps:
1) preparing a porous skeleton comprising interconnected channels by 3D printing; and
2) performing hydrophobic modification on the porous skeleton to obtain the evaporator.

According to an embodiment, in the step 1), 3D printable ink is prepared; and printing is performed layer by layer to obtain the porous skeleton comprising interconnected channels.

According to an embodiment, the 3D printable ink comprises a polymer precursor or a polymer, and may further comprises at least one of a light absorbing material and a rheology modifier.

According to an embodiment, the polymer precursor is a polymeric monomer forming the polymer matrix described above.

According to an embodiment, the polymer is a polymer as defined in the polymer matrix described above.

According to an embodiment, the light absorbing material and the rheology modifier are as defined above.

According to an embodiment, the 3D printable ink further comprises a solvent. Specifically, the solvent is selected from water (e.g., deionized water).

According to an embodiment, the polymer precursor or the polymer in the 3D printable ink has a mass percentage of 5%-40%; illustratively, may have a mass percentage of 5%, 10%, 15%, 20%, 25%, 30%, 40%, or any point value within a range consisting of a pairwise combination of those point values, provided that the sum of the mass percentages of the components in the ink is 100%.

According to an embodiment, the 3D printable ink comprises a light absorbing material with a mass percentage of 0%-6%; illustratively, may comprise a light absorbing material with a mass percentage of 1%, 2%, 3%, 4%, 5%, 6%, or any point value within a range consisting of a pairwise combination of those point values, provided that the sum of the mass percentages of the components in the ink is 100%.

According to an embodiment, the 3D printable ink comprises a rheology modifier with a mass percentage of 0%-8%; illustratively, may comprise a rheology modifier with a mass percentage of 1%, 2%, 3%, 4%, 5%, 6%, 7%, 8%, or any point value within a range consisting of a pairwise combination of those point values, provided that the sum of the mass percentages of the components in the ink is 100%.

According to an embodiment, in the step 1), firstly, a layer of layer bodies arranged in the form of filaments is printed using the 3D printable ink by a 3D printing device, with a certain gap formed between filaments; then, a second layer is printed in a staggered manner, and so on, to obtain a porous skeleton comprising interconnected channels.

According to an embodiment, in the step 2), the porous skeleton comprising interconnected channels in the step 1) is immersed in a solution containing a hydrophobic reagent for a certain period of time to form a hydrophobic decoration on the surface of the porous skeleton, so that the evaporator is obtained.

According to an embodiment, the hydrophobic reagent is a mixture of a prepolymer for organopolysiloxane and a cross-linking agent, or a mixture of at least one of inorganic oxides (e.g., one or more of $TiO_2$ and $SiO_2$), a prepolymer for organopolysiloxane and a cross-linking agent.

According to an embodiment, the solution containing the hydrophobic reagent comprises a solvent. Specifically, the solvent is selected from ester solvents, e.g., ethyl acetate.

According to an embodiment, in the solution containing the hydrophobic reagent, a sum of mass fractions of a prepolymer for organopolysiloxane and a cross-linking agent are 0.01%-10%, e.g., 0.01%, 0.1%, 0.5%, 1%, 2%, 3%, 4%, 5%, 6%, 7% 8%, 9% 10%, or any point value within a range consisting of a pairwise combination of those point values, provided that the sum of the mass percentages of the components in the solution is 100%.

According to an embodiment, the prepolymer for organopolysiloxane and the cross-linking agent are mixed in a ratio of (5-15):1, e.g., 5:1, 6:1, 7:1, 8:1, 9:1, 10:1, 11:1, 12:1, 13:1, 14:1 or 15:1.

According to an embodiment, in the solution containing the hydrophobic reagent, a mass fraction of an inorganic oxide is 0%-5%, e.g., 0%, 1%, 2%, 3%, 4%, 5%, or any point value within a range consisting of a pairwise combination of those point values, provided that the sum of the mass percentages of the components in the solution is 100%.

According to an embodiment, in the solution containing the hydrophobic reagent, a mass fraction of $SiO_2$ is 0%-5%, e.g., 0%, 1%, 2%, 3%, 4%, 5%, or any point value within a range consisting of a pairwise combination of those point values, provided that the sum of the mass percentages of the components in the solution is 100%.

According to an embodiment, in the solution containing the hydrophobic reagent, a mass fraction of $TiO_2$ is 0%-5%, e.g., 0%, 1%, 2%, 3%, 4%, 5%, or any point value within a range consisting of a pairwise combination of those point values, provided that the sum of the mass percentages of the components in the solution is 100%.

The present disclosure also provides a water collection system, especially for solar desalination, which comprises a water collection device and an evaporation module to generate steam from brine, wherein the evaporation module comprises the evaporator described above.

According to an embodiment, the water collection device also includes a condenser to transfer steam to water droplets, a cooling chamber to accelerate steam condensation, a collection tube to collect purified water, a seawater inlet and outlet for brine replenishment and removal. According to an embodiment, we propose a hierarchical salt-rejection (HSR) strategy to achieve long-term salt resistance in highly salty water and, more importantly, high water evaporation rate.

The constructed unique structure of the interconnected channel, porous skeleton, and hydrophobic decoration, avoiding salt depositing on the evaporation surface and fast diffusion of salt ions from the porous skeleton through a micro-sized pathway to the interconnected channel and finally arterial transported to the bulk water.

According to an embodiment, the water collection system can realize the stable evaporation for 7 days in 20 wt % NaCl solution.

According to an embodiment, the water collection system can realize the continuous evaporation for 24 h without salt precipitation in 20 wt % NaCl solution is realized.

According to an embodiment, the water collection system can remove over 99% of metal ions ($Na^+$, $Mg^{2+}$, $Ca^{2+}$, $K^+$).

According to an embodiment, the purified water obtained in the water collection system is used for industrial and agricultural applications.

Advantageous Effects of the Present Invention

1. The present invention provides a HSR strategy for sustainable solar water evaporation even in high salinity water.
2. The continuous evaporation for 24 h without salt precipitation in 20 wt % NaCl solution is realized by this invention.
3. By 1 intensity of sunlight exposure, it is possible to achieve a high evaporation rate of 2.8 kg $m^{-2}$ $h^{-1}$ and an efficiency of 97%.
4. The invention can remove over 99% of metal ions ($Na^+$, $Mg^{2+}$, $Ca^{2+}$, $K^+$).
5. The purified water obtained from the system of the present invention can be used for industrial and agricultural applications.

DETAILED DESCRIPTION OF THE INVENTION

Certain exemplary embodiments will now be described to provide an overall understanding of the preparation, mechanism, function, and use of the devices and methods disclosed herein. One or examples of these embodiments are illustrated in the accompanying drawings. Those skilled in the art will understand that the devices and methods specifically described herein and illustrated in the accompanying drawings are nonlimiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose.

According to an embodiment, a novel salt-rejection strategy is configured to continuously solar water purification. This strategy includes the hierarchal steps to prevent salt crystals from accumulating on the evaporation surface and fast diffusing salt ions to the bulk water, which leads to the long-term stable evaporation without salt-fouling.

Figure 1:
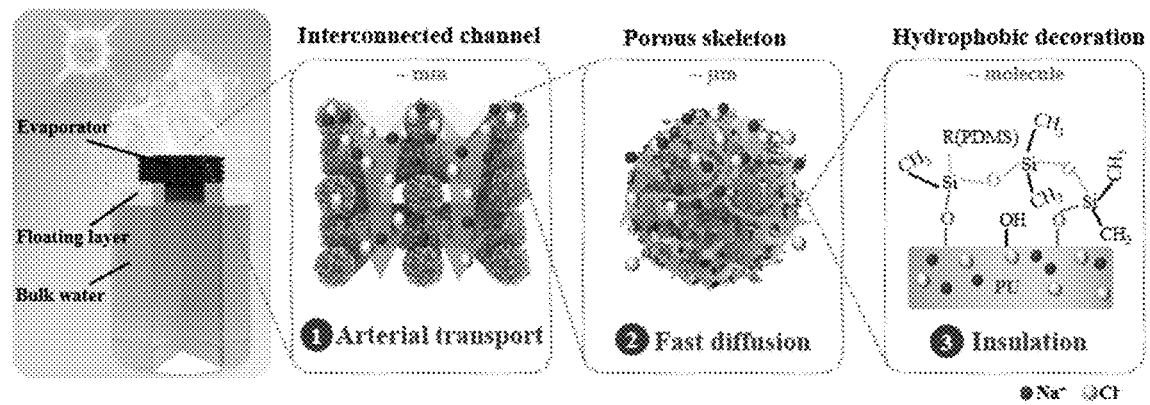
FIG. 1 is a general depiction of the HSR strategy of the present invention for long-term desalination.

As shown in FIG. 1, the HSR strategy was realized by the unique internal structure of evaporator, including interconnected channels, porous skeleton, and hydrophobic decoration. During water evaporation, the salt is rejected by the hydrophobic decoration, which forms an insulating layer on the evaporation surface. Then, the accumulated salt ions fast diffused from the porous skeleton to the water channel through a very short diffusion path (micro-sized in the porous skeleton). Consequently, the salt ions are transported to the bulk water by the interconnected channel, ensuring continuous and stable evaporation. Additionally, the unique structure also favorable for improving the evaporation rate.

Figure 2:
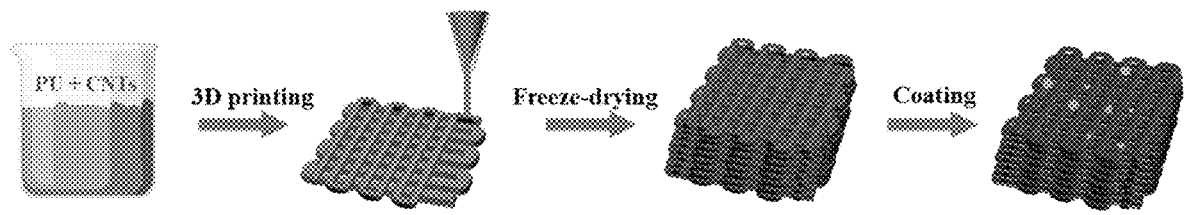
FIG. 2 describes a preparation of the HSR evaporation of the present invention.

As shown in FIG. 2, the light absorbing materials, rheology modifier, and polymer precursor were mixed to prepare the 3D printable ink. Specifically, the 3D printable ink consists of 5-40 wt % of the polymer precursor, 1-6 wt % of the light absorbing material, and 1-8 wt % of the hydrology modifier, with the balance being water (specifically, deionized water). Illustratively, the 3D printable ink may consist of 30 wt % of the polymer precursor, 3 wt % of the light absorbing material, and 3 wt % of the rheology modifier, with the balance being deionized water. Illustratively, the polymer precursor is, for example, a precursor of polyurethane (including a mixture of monomers forming polyurethane); the light absorber is selected from a carbon nanotube; and the rheology modifier is selected from Laponite-XLG).

Firstly, a layer of layer bodies arranged in the form of filaments was printed using the 3D printable ink by a 3D printing device, with a certain gap formed between filaments; then, a second layer was printed in a staggered manner, and so on, to obtain the porous skeleton comprising interconnected channels.

After the 3D printing, the sample was freeze-dried and immersed in the hydrophobic solution to obtain the hydrophobic decoration.

In the detailed description of the exemplary embodiments, carbon nanotubes were used as the light absorbing materials, nano clay was selected as the rheology modifier, polyurethane (PU) was used as the polymer matrix, and PDMS was employed as the hydrophobic decoration.

Specifically, the hydrophobic solution consists of 0.01%-10% of the prepolymer for PDMS and curing agent, with the balance being the solvent ethyl acetate. Illustratively, the hydrophobic solution consists of 0.1% of the prepolymer for PDMS and current agent, with the balance being the solvent ethyl acetate.

Figure 3:
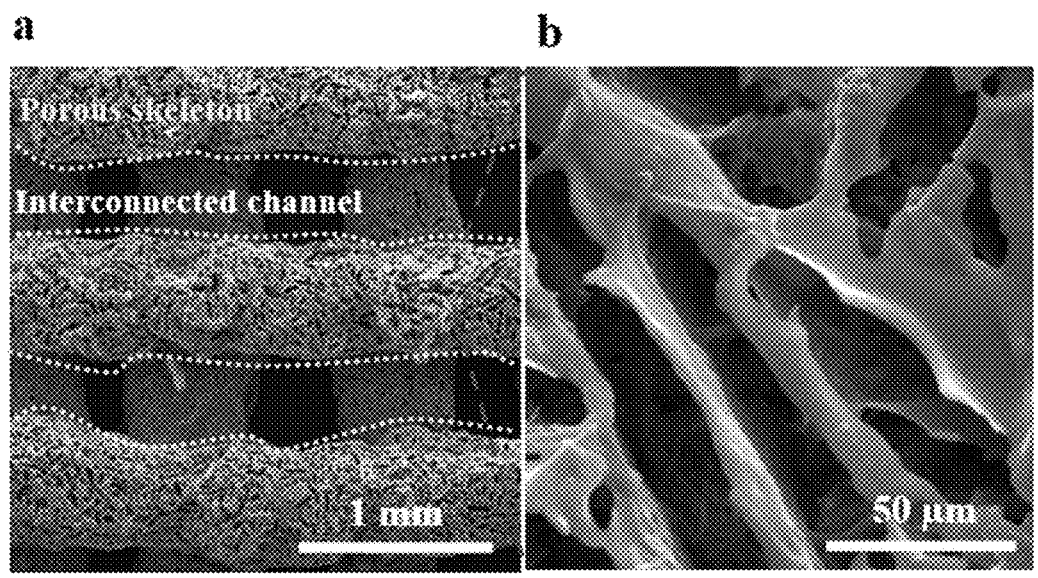
FIG. 3 is the microscopic images of the HSR evaporator of the present invention.

As shown in FIG. 3, the micro-structure of the HSR evaporator was observed under scanning electron microscopy. As it can be seen, the porous skeleton consists of the interlaced filaments that with diameters of about 500 μm. The gaps between these filaments formed the interconnected channel (highlighted by the yellow dots line).

Figure 4:
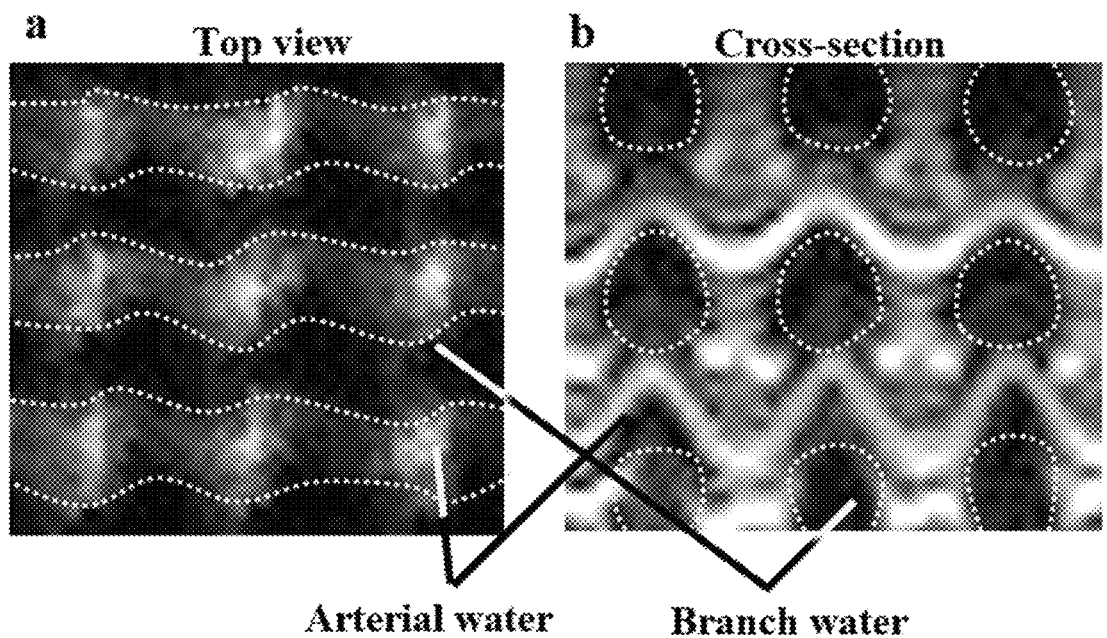
FIG. 4 is the MRI images of the HSR evaporator of the present invention.

As shown in FIG. 4, the water distribution inside of the HSR evaporator was observed by the magnetic resonance imaging. A strong signal of water molecular was observed in the bright domains, demonstrating that a large proportion of water was distributed in the interconnected channel (denotes as arterial water). A relatively small proportion of water was found in the porous skeleton and denotes as branch water.

In FIGS. 5-10, the samples are as follows: 3DP is a porous skeleton not immersed in a hydrophobic reagent; HSR1 is a porous skeleton immersed in a hydrophobic reagent comprising the prepolymer for PDMS and the cross-linking agent with a mass fraction of 0.5%; HSR2 is a porous skeleton immersed in a hydrophobic reagent comprising the prepolymer for PDMS and the cross-linking agent with a mass fraction of 0.1%; and HSR3 is a porous skeleton immersed in a hydrophobic reagent comprising the prepolymer for PDMS and the cross-linking agent with a mass fraction of 1%.

Figure 5:
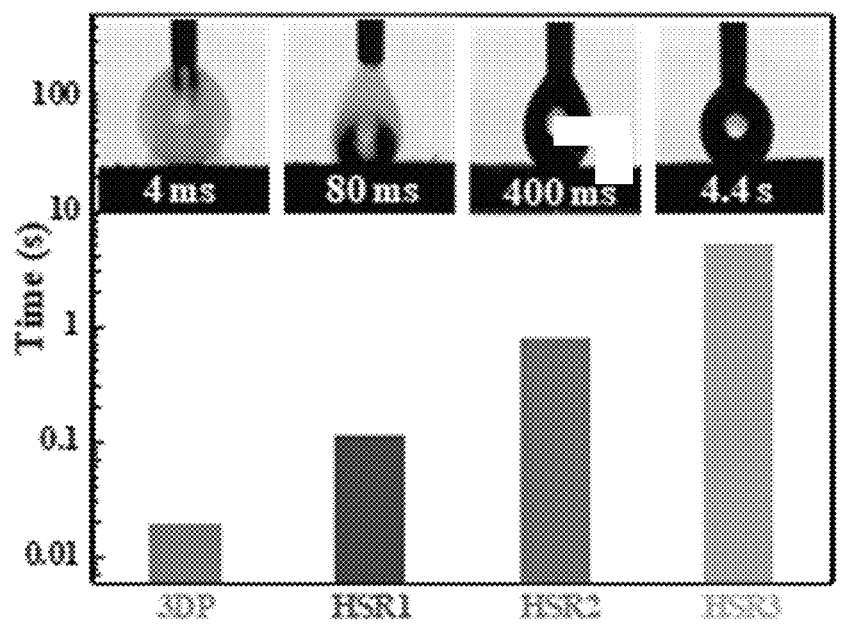
FIG. 5 describes the wettability of different HSR evaporators of the present invention.

As shown in FIG. 5, the HSR evaporators with different wettabilities were obtained by hydrophobic decoration. The time for full absorption of a water droplet increased from 4 ms to 4.4 s for different samples. 3DP is a porous skeleton not immersed in a hydrophobic reagent; HSR1 is a porous skeleton immersed in a hydrophobic reagent comprising the prepolymer for PDMS and the cross-linking agent with a mass fraction of 0.5%; HSR2 is a porous skeleton immersed in a hydrophobic reagent comprising the prepolymer for PDMS and the cross-linking agent with a mass fraction of 0.1%; and HSR3 is a porous skeleton immersed in a hydrophobic reagent comprising the prepolymer for PDMS and the cross-linking agent with a mass fraction of 1%.

Figure 6:
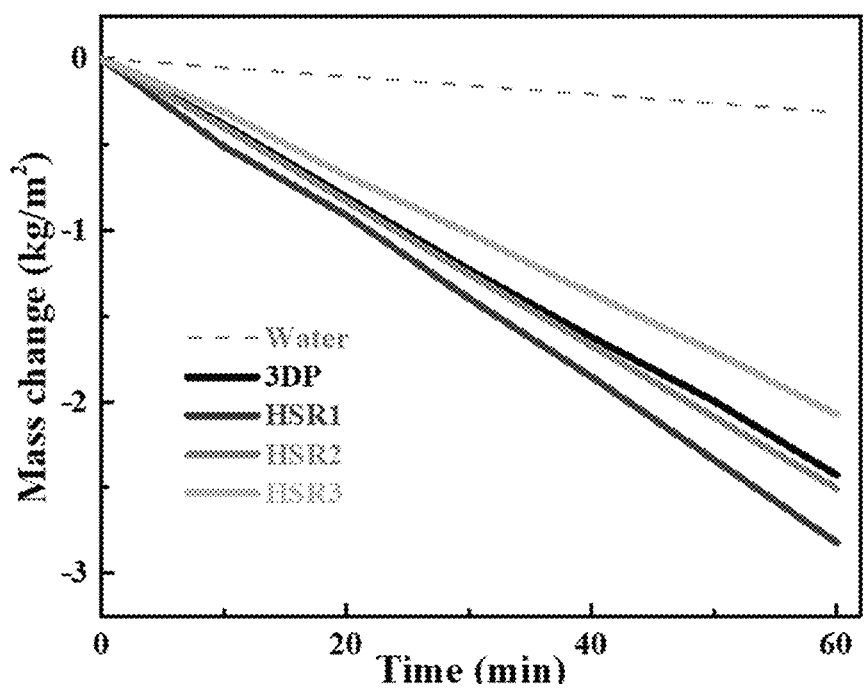
FIG. 6 describes the mass change over time of different evaporators of the present invention.

In FIG. 6, the mass change of the different HSR evaporators and water under 1 kW/m² irradiation. 3DP is a porous skeleton not immersed in a hydrophobic reagent; HSR1 is a porous skeleton immersed in a hydrophobic reagent comprising the prepolymer for PDMS and the cross-linking agent with a mass fraction of 0.5%; HSR2 is a porous skeleton immersed in a hydrophobic reagent comprising the prepolymer for PDMS and the cross-linking agent with a mass fraction of 0.1%; and HSR3 is a porous skeleton immersed in a hydrophobic reagent comprising the prepolymer for PDMS and the cross-linking agent with a mass fraction of 1%.

Figure 7:
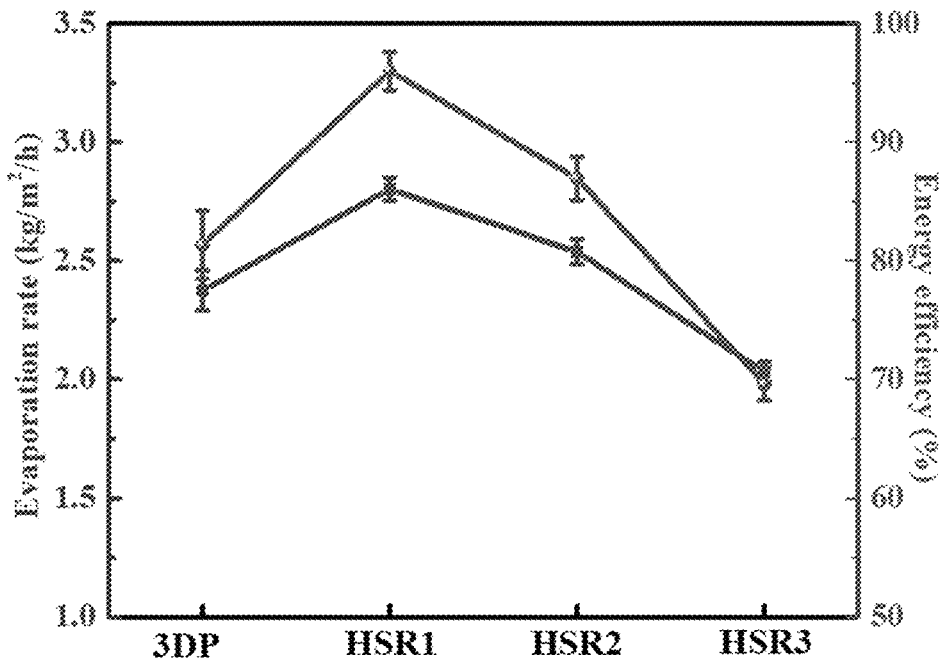
FIG. 7 describes the efficiency and water evaporation rate of different evaporators of the present invention.

In FIG. 7, the evaporation rate and efficiency of different HSR evaporators were summarized. HSR1 shows the best evaporation performance with an evaporation rate up to 2.84 kg m$^{-2}$ h$^{-1}$ and an efficiency over 95%. The HSR1 is a porous skeleton immersed in a hydrophobic reagent comprising the prepolymer for PDMS and the cross-linking agent with a mass fraction of 0.5%.

Figure 8:
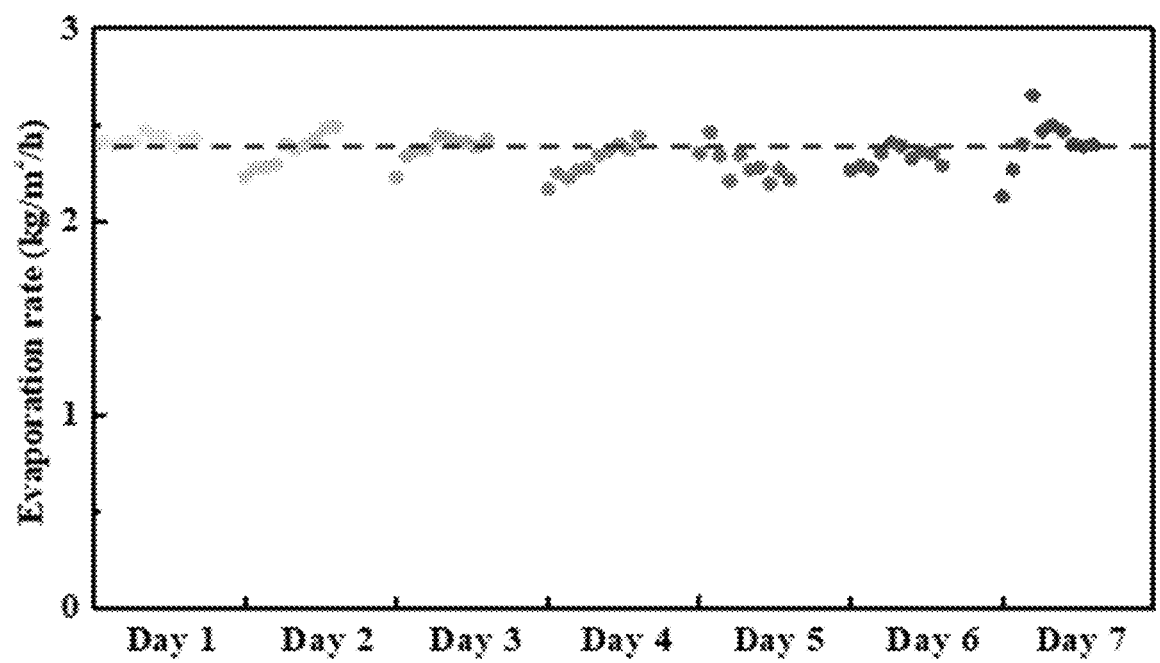
FIG. 8 describes the long-term cyclic evaporation test of the HSR evaporator of the present invention at 20 wt. % salt brine.
Figure 9:
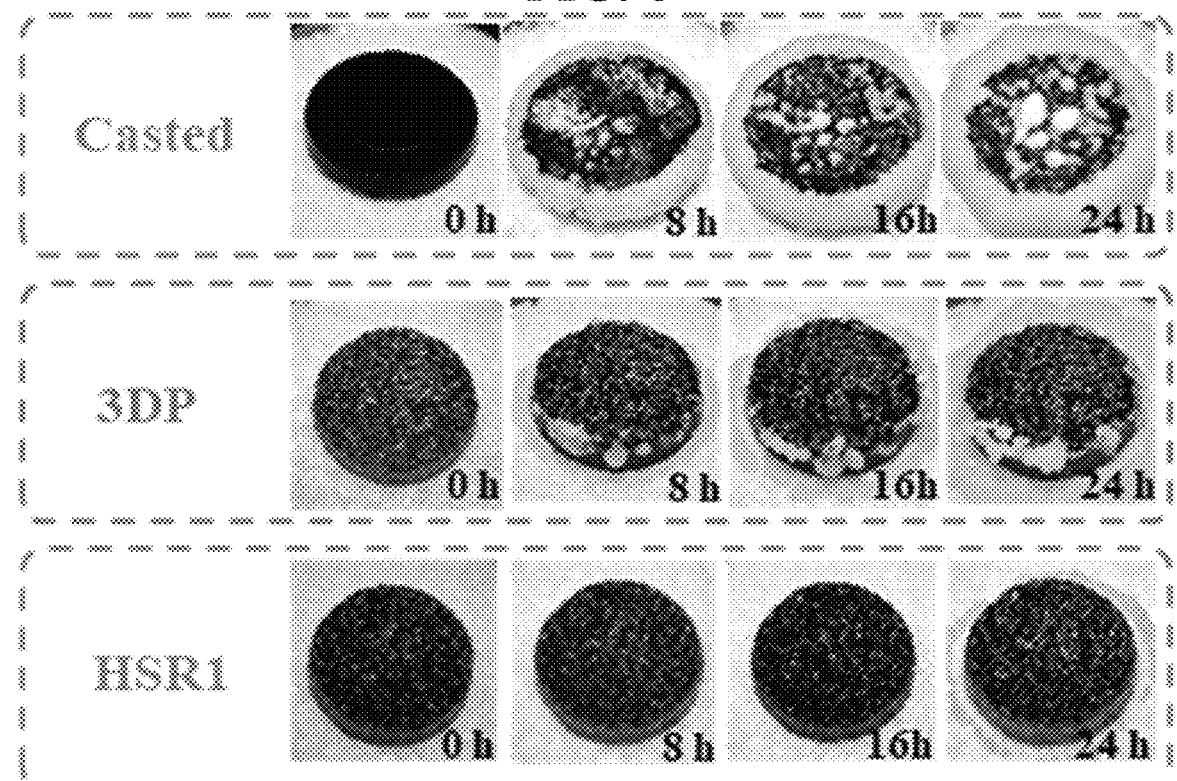
FIG. 9 and FIG. 10 describe the continuous 24 h water evaporation of casted evaporator, 3D printed evaporator without hydrophobic treatment, and HSR evaporator of the present invention at 20 wt. % salt brine.
Figure 10:
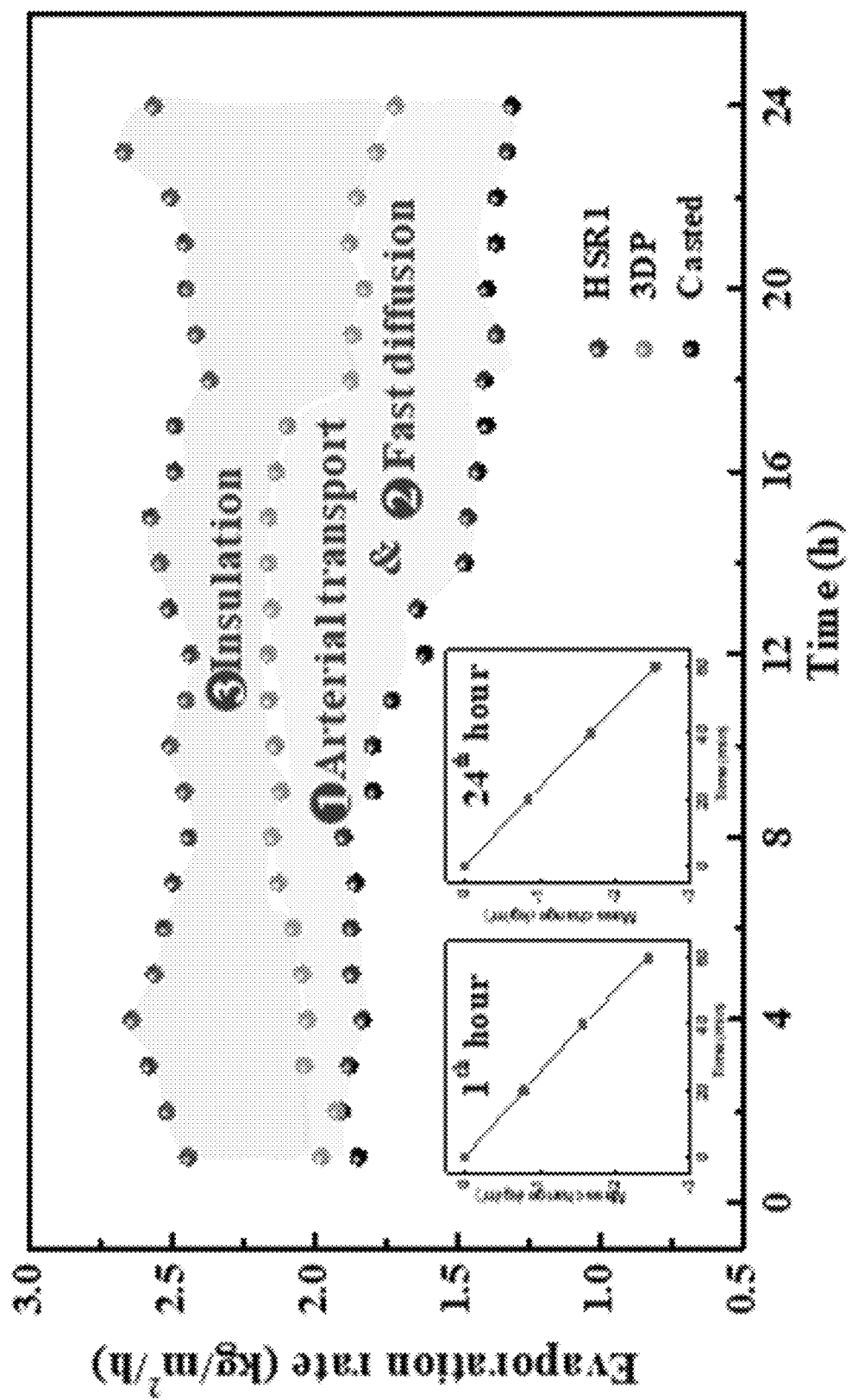

As shown in FIG. 8, to demonstrate the highly stable property of the HSR evaporator, the cyclic testing was carried out in high concentration brine (20 wt %) with 10 h continuous illumination time for each cycle (simulating the typical daily natural sunshine irradiation in Hong Kong). Remarkably, no salt was observed in the whole process and the high evaporation rate was retained over one week, implying the efficient salt-rejection of our strategy For FIGS. 9-10, to testify the critical roles of arterial transport, fast diffusion, and insulation for the long-term salt-rejection, casted and direct 3D printed samples were used as the control groups for 24 h continuous desalination test in 20 wt. % brine. Compared with the HSR evaporator, the direct 3D printed sample without insulation layer, and the casted sample has no micro-sized fast diffusion path, arterial transport channel, and insulation layer. As a result, besides the high water evaporation rate (around 2.5 kg m$^{-2}$ h$^{-1}$), neither salt precipitation nor evaporation rate decline is observed for HSR sample upon the 24 h operation. By contrast, the casted and directed 3D printed evaporators suffer from severe salt fouling on the evaporation surface and thus exhibit over 30% and 14% reduce in the evaporation rate, respectively. As shown in FIG. 10, the blue zone represents the effect of arterial transport and fast diffusion on the salt-rejection property, while the origin region presents the role of the insulation. In this experiment, over 54% enhancement in the water evaporation mass was achieved by our HSR strategies for the first 24 h operation. These data indicate that the novel HSR design is reliable for long-term and high efficient solar water evaporation.

Figure 11:
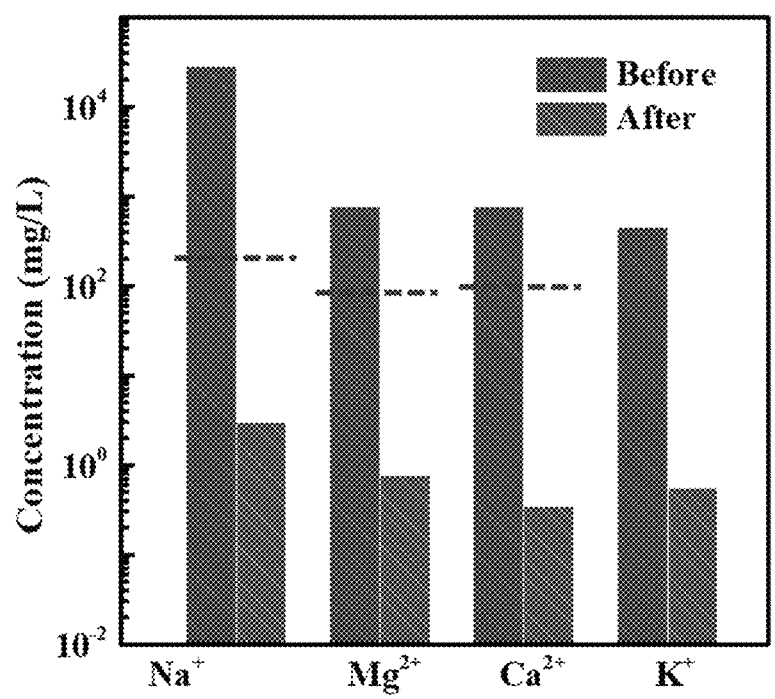
FIG. 11 describes the desalination ability of the HSR evaporator of the present invention.

As shown in FIG. 11, different metals (Na$^+$, Mg$^{2+}$, Ca$^{2+}$, K$^+$) are shown to be purified by this evaporation method. After purification, the salt concentrations strikingly decreased by about 4 orders of magnitude and lower than the drinking water standards defined by World Health Organization (WHO).

Figure 12:
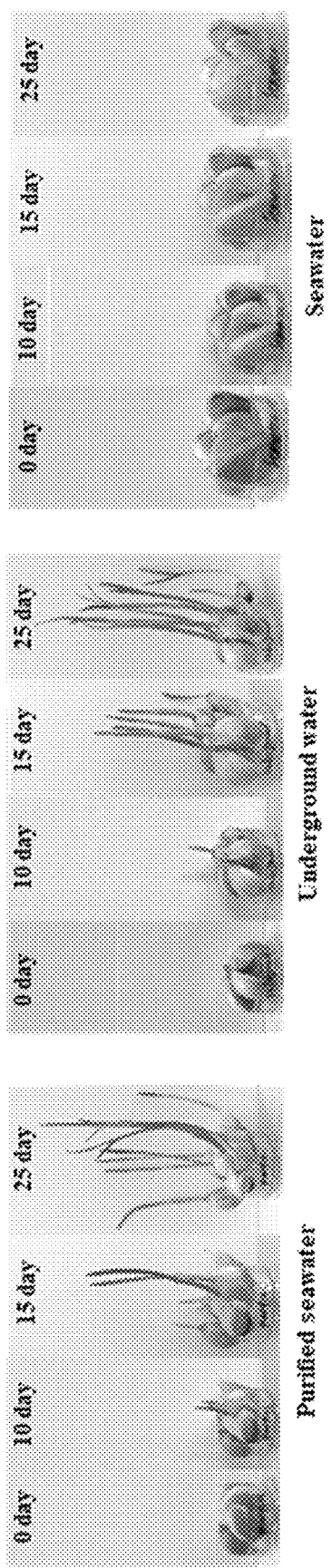
FIG. 12 describes the agricultural application of the solar water desalination system of the present invention.

As shown in FIG. 12, the purified water was used for agricultural applications. Three groups of garlic were placed in the same ambient condition and irrigated by an equal amount of purified seawater, underground water, and seawater, respectively. After 25 days cultivation, the seawater irrigated garlic totally cannot survive due to the excessive salt ions, by contrast, the garlic watered by the purified seawater and underground water can grow very well, demonstrating the practical potential for long-lifetime applications of the HSR evaporation device.

In summary, the invention presents an HSR strategy to prevent salt precipitation during evaporation while maintaining long-term stability and rapid evaporation rate even in high salinity brine.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The embodiments of the present invention have been described above. However, the present invention is not limited to the above embodiments. Any modification made within the spirit and scope of the present invention, equivalent substitution, improvement, etc., should be included within the scope of the present invention.

The invention claimed is:

1. An evaporator, comprising:
a porous skeleton and a hydrophobic coating disposed on a surface of the porous skeleton,
wherein the porous skeleton contains interconnected channels,
wherein the porous skeleton comprises a plurality of layers of filaments, wherein each layer of filaments comprises an array of filaments and the filaments between two adjacent layers are arranged in a staggered manner, and
wherein the hydrophobic coating comprises an organopolysiloxane, a silane coupling agent, and an inorganic oxide.

2. The evaporator according to claim 1, wherein the hydrophobic coating is disposed by immersing the porous skeleton in a solution comprising a prepolymer for the organopolysiloxane, the silane coupling agent, and the inorganic oxide selected from $TiO_2$, $SiO_2$, and a mixture thereof.

3. The evaporator according to claim 1, wherein the interconnected channels reside in gaps amongst the filaments.

4. The evaporator according to claim 2, wherein the gaps reside between filaments residing in a same layer of filaments and between filaments residing in two adjacent layers arranged in the staggered manner.

5. A preparation method for the evaporator according to claim 1, comprising the following steps:
1) Preparing the porous skeleton containing interconnected channels by 3D printing; and
2) applying the hydrophobic coating on the porous skeleton to obtain the evaporator,
wherein the hydrophobic coating comprises the organopolysiloxane, the silane coupling agent, and the inorganic oxide.

6. The preparation method according to claim 5, wherein in step 1), 3D printing is performed layer by layer to obtain the porous skeleton.

7. The preparation method according to claim 5, wherein step 1) comprises printing a first layer of filaments using a 3D printable ink by a 3D printing device; and printing a second layer of filaments a staggered manner on the first layer of filaments.

8. The preparation method according to claim 5, wherein in step 2), the porous skeleton obtained from step 1) is immersed in a solution containing the organopolysiloxane, the silane coupling agent, and the inorganic oxide for a period of time to form the hydrophobic coating on the surface of the porous skeleton.

9. A water collection system, comprising:
a water collection device; and
an evaporation module in contact with a brine,
wherein the evaporation module comprises the evaporator according to claim 1.

10. The water collection system according to claim 9,
wherein stable evaporation for 7 days in 20 wt % NaCl solution is realized;
and/or, wherein continuous evaporation for 24 h without salt precipitation in 20 wt % NaCl solution is realized; and/or
wherein over 99% of metal ions ($Na^+$, $Mg^{2+}$, $Ca^{2+}$, $K^+$) were removed from the brine; and/or
wherein purified water obtained from the water collection system is used for industry and agricultural applications.

11. The evaporator according to claim 1, wherein the filament comprises polyurethane, carbon nanotubes, and a rheology modifier.

12. The preparation method according to claim 7, wherein the 3D printable ink comprising a precursor for polyurethane, carbon nanotube, and a rheology modifier.

* * * * *